(12) United States Patent
Sakamoto et al.

(10) Patent No.: US 9,387,528 B2
(45) Date of Patent: Jul. 12, 2016

(54) NOZZLE

(71) Applicant: PRIMETALS TECHNOLOGIES JAPAN, LTD., Tokyo (JP)

(72) Inventors: Koichi Sakamoto, Tokyo (JP); Yoichi Haraguchi, Tokyo (JP); Yuji Ikemoto, Tokyo (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 0 days.

(21) Appl. No.: 14/426,551

(22) PCT Filed: Jun. 26, 2013

(86) PCT No.: PCT/JP2013/067471
§ 371 (c)(1),
(2) Date: Mar. 6, 2015

(87) PCT Pub. No.: WO2014/050234
PCT Pub. Date: Apr. 3, 2014

(65) Prior Publication Data
US 2015/0217351 A1  Aug. 6, 2015

(30) Foreign Application Priority Data

Sep. 26, 2012  (JP) ................. 2012-212036

(51) Int. Cl.
*B05B 1/00* (2006.01)
*B21B 45/02* (2006.01)
(Continued)

(52) U.S. Cl.
CPC .............. *B21B 45/0233* (2013.01); *B05B 1/00* (2013.01); *B05B 1/02* (2013.01); *B05B 1/20* (2013.01); *B05B 1/304* (2013.01); *B05B 1/3046* (2013.01); *B05B 1/32* (2013.01); *B05B 15/069* (2013.01); *F02M 51/061* (2013.01); *F16K 1/126* (2013.01); *F16K 25/005* (2013.01); *F16K 31/122* (2013.01); *B05B 1/306* (2013.01); *B05B 1/3066* (2013.01); *B21B 45/0218* (2013.01)

(58) Field of Classification Search
CPC ...... B05B 15/069; B05B 1/20; B05B 1/3046; B05B 1/00; B05B 1/02; B05B 1/3066; B05B 1/306; B05B 1/32; B05B 1/304; F02M 51/061; B21B 45/0218; B21B 45/0233; F16K 31/122; F16K 1/126; F16K 25/005
USPC .............. 239/550, 566, 583, 584, 585.1, 589, 239/591
See application file for complete search history.

(56) References Cited

U.S. PATENT DOCUMENTS

| | | | |
|---|---|---|---|
| 2005/0098664 A1* | 5/2005 | Catasus-Servia .. | F02M 51/0682 239/585.1 |
| 2009/0302136 A1* | 12/2009 | Song ................. | F02M 21/0263 239/584 |

FOREIGN PATENT DOCUMENTS

| | | |
|---|---|---|
| JP | 59-076616 A | 5/1984 |
| JP | 60-133913 A | 7/1985 |

(Continued)

*Primary Examiner* — Steven J Ganey
(74) *Attorney, Agent, or Firm* — Ladas & Parry LLP

(57) ABSTRACT

Provided is a nozzle incorporating a valve, which easily improves durability. The nozzle for spraying water to a targeted object, including a nozzle body provided with a passage of water and a valve arranged inside the passage of the nozzle body, wherein at least a part of an inner surface of the passage including a portion to have contact with the valve is coated by diamond-like carbon.

4 Claims, 9 Drawing Sheets

(51) Int. Cl.
*F02M 51/06* (2006.01)
*B05B 15/06* (2006.01)
*B05B 1/30* (2006.01)
*B05B 1/20* (2006.01)
*B05B 1/02* (2006.01)
*F16K 31/122* (2006.01)
*F16K 1/12* (2006.01)
*F16K 25/00* (2006.01)
*B05B 1/32* (2006.01)

(56) References Cited

FOREIGN PATENT DOCUMENTS

| | | |
|---|---|---|
| JP | 06-091320 A | 4/1994 |
| JP | 08-257620 A | 10/1996 |
| JP | 09-052111 A | 2/1997 |
| JP | 2008-196324 A | 8/2008 |
| JP | 2011-137495 A | 7/2011 |

* cited by examiner

NOZZLE

TECHNICAL FIELD

The present invention relates to a nozzle for spraying water to an object.

BACKGROUND ART

A manufacturing apparatus (manufacturing line) of a steel sheet by rolling has a step of spraying water over the steel sheet for the purpose of removing a scale formed and cooling the steel sheet having a high temperature. As is known, the spraying of water is carried out by means of a nozzle.

Patent Literatures 1 to 4 disclose techniques for incorporating a valve in each nozzle. By providing a valve for each nozzle, it is possible to separately choose a nozzle to spray water and a nozzle not to spray water. Accordingly, it is possible to inhibit an excessive water supply and water discharge, whereby it is possible to save energy and attain efficiency. Also, if a switching valve is provided for a large pipe provided on an upstream side which supplies water to the nozzle to thereby control water supply to the nozzle there, a shock, a so-called water hammer becomes large, which sometimes negatively affects the pipe and the like. By providing a valve for each nozzle, it is possible to inhibit the water hammer. To the valve used for a high-pressure pipe, sometimes a stellite build-up is applied in order to improve abrasion resistance property of the valve.

CITATION LIST

Patent Literatures

Patent Literature 1: Japanese Patent Application Laid-Open No. S59-76616
Patent Literature 2: Japanese Patent Application Laid-Open No. S60-133913
Patent Literature 3: Japanese Patent Application Laid-Open No. H06-91320
Patent Literature 4: Japanese Patent Application Laid-Open No. H09-52111

SUMMARY OF INVENTION

Technical Problem

By providing the valve for the nozzle as described above, closing and opening of a passage is carried out by the valve operating in the nozzle. Therefore, a portion is created between the valve and an inner surface of the passage where the valve and the inner surface have contact with, separate from, and slide along each other. Conventionally, a stellite build up is carried out on the valve to be attached to a high-pressure pipe. Therefore the stellite build up is also carried out to such a portion in the same manner as to the valve, to thereby improve abrasion resistance property. However, since the processing of stellite build up is expensive, installation of a large amount of nozzles provided with stellite build-up valves is sometimes abandoned due to its high cost.

Also, at the slide portion, a sealing member becomes intolerant of the sliding resistance force due to repeated use of the valve, which creates a deformation and breakage of the sealing member, whereby sometimes a seal failure occurs early on.

Considering the above problems, an object of the present invention is to provide a nozzle incorporating a valve capable of easily and inexpensively improving durability.

Solution to Problem

Hereinafter, the present invention will be described.

A first aspect of the present invention is a nozzle for spraying water to a targeted object, including a nozzle body provided with a passage of water, and a valve arranged inside the passage of the nozzle body, wherein at least a part of an inner surface of the passage, the part including a portion to have contact with the valve, is coated by diamond-like carbon.

A second aspect of the present invention is the nozzle according to the first aspect, wherein the valve is a switching valve.

A third aspect of the present invention is the nozzle according to the first or second aspect, wherein the portion to have contact with the valve is a portion where spraying of the water is inhibited by the valve having contact with the inner surface of the passage and the spraying of the water is allowed by the valve moving from a position of contacting to a position of separating.

A fourth aspect of the present invention is the nozzle according to the first to third aspect, wherein the portion to have contact with the valve is a portion where the valve is always in contact with the inner surface of the passage and the portion to have contact with the valve on the inner surface of the passage slides with the valve in accordance with opening and closing of the valve.

Advantageous Effect of Invention

According to the present invention, it is possible to easily and inexpensively improve durability at a contact/separation portion and a slide portion of the valve and the inner surface of the nozzle.

DESCRIPTION OF EMBODIMENTS

Figure 1:
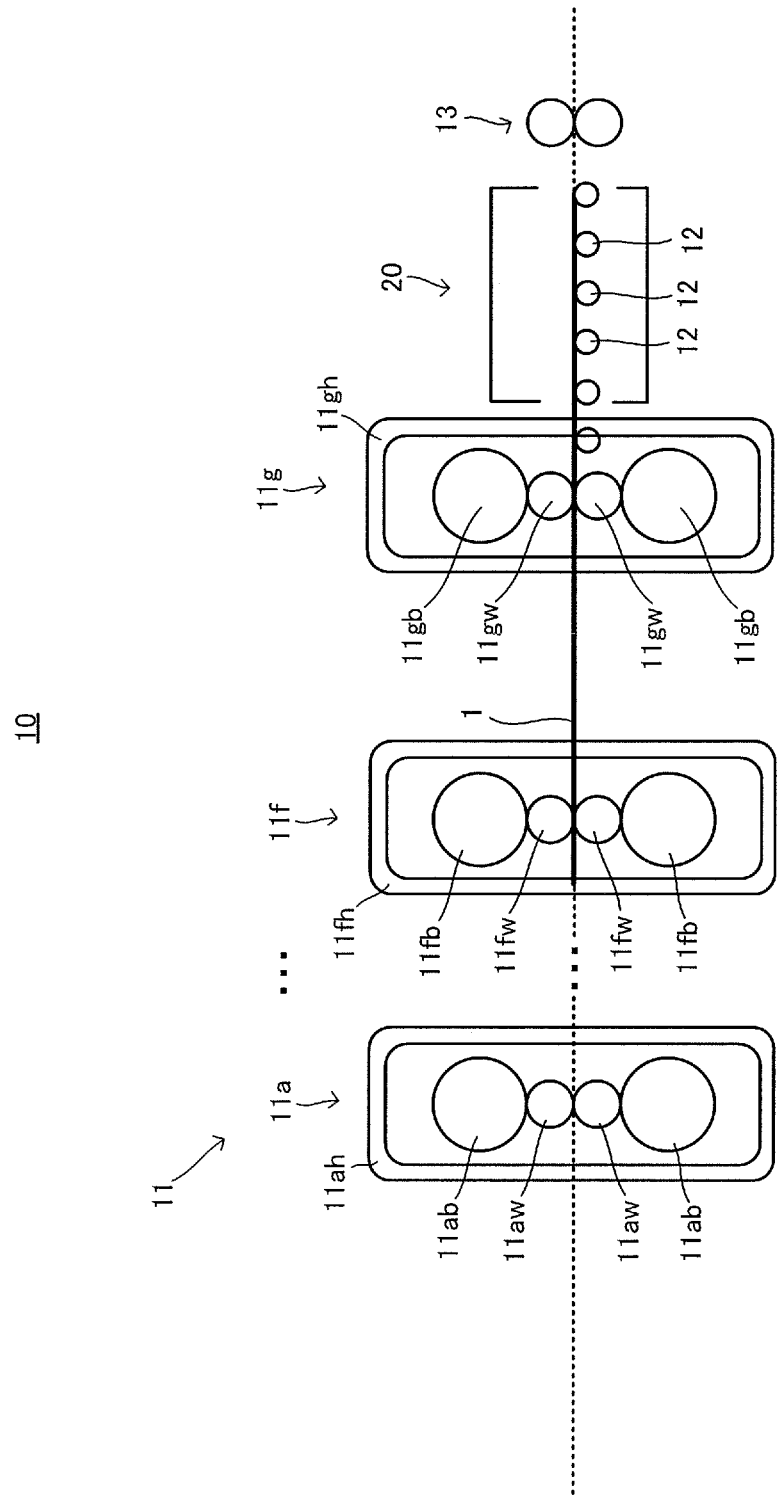
FIG. 1 is a view to explain one embodiment, schematically showing apart of a manufacturing apparatus 10 of a hot-rolled steel sheet.

The above-mentioned functions and benefits of the present invention will be apparent from the description of the embodiments described below. The present invention will be described based on the embodiments shown in the drawings. However, the present invention is not limited to these embodiments.

FIG. 1 is a view to explain one embodiment, schematically showing a part of a manufacturing apparatus 10 of a hot-rolled steel sheet. In FIG. 1, a steel sheet 1 is transported from a left on the sheet of paper (upper process side, upstream side) to a right on the sheet of paper (lower process side, downstream side), and a vertical direction on the sheet of paper is a vertical direction of the apparatus 10. A direction from the upper process side (upstream side) to the lower process side (downstream side) may be referred to as a sheet passing direction; and a direction of a width of the steel sheet being transported which is orthogonal to the sheet passing direction, may be referred to as a sheet width direction. Further, repeated reference symbols may be omitted in the drawings for the purpose of easy viewing.

As shown in FIG. 1, the manufacturing apparatus 10 of a hot-rolled steel sheet is provided with a row 11 of hot finish rolling mills, a transporting roll 12, a draining roll 13, and a cooling apparatus 20. Further, a heating furnace, a row of rough rolling mills and the like, the figures and descriptions of which are omitted, are arranged on the upper process side than the row 11 of hot finish rolling mills and set better conditions of a steel sheet for entering the row 11 of hot finish rolling mills. Further, a thermometer for entering side for measuring the starting temperature of the rapid cooling is provided on an entering side of the row 11 of hot finish rolling mills. On the other hand, on the lower process side of the draining roll 13, a draining spray for draining the pressurized water sprayed from the cooling apparatus and slightly leaking from a gap between the draining roll 13 and the steel sheet 1 is arranged. Further, on an exit side of the draining roll 13, a thermometer for exit side for measuring the stopping temperature of rapid cooling (in a case where the rapid cooling is not carried out, rolling finishing temperature) is provided. In addition, a pinch roll which applies a predetermined tension to the steel sheet is also arranged.

A hot-rolled steel sheet is generally manufactured in the following way. That is, a rough bar which has been taken from a heating furnace and has been rolled by a rough rolling mill to have a predetermined thickness is rolled continuously by the row 11 of hot finish rolling mills to a predetermined thickness as the temperature thereof is controlled. After that, the steel sheet is cooled in the cooling apparatus 20. The steel sheet which has passed through the draining roll 13 is cooled by another cooling apparatus to a predetermined coiling temperature to be coiled by a coiler.

Figure 2:
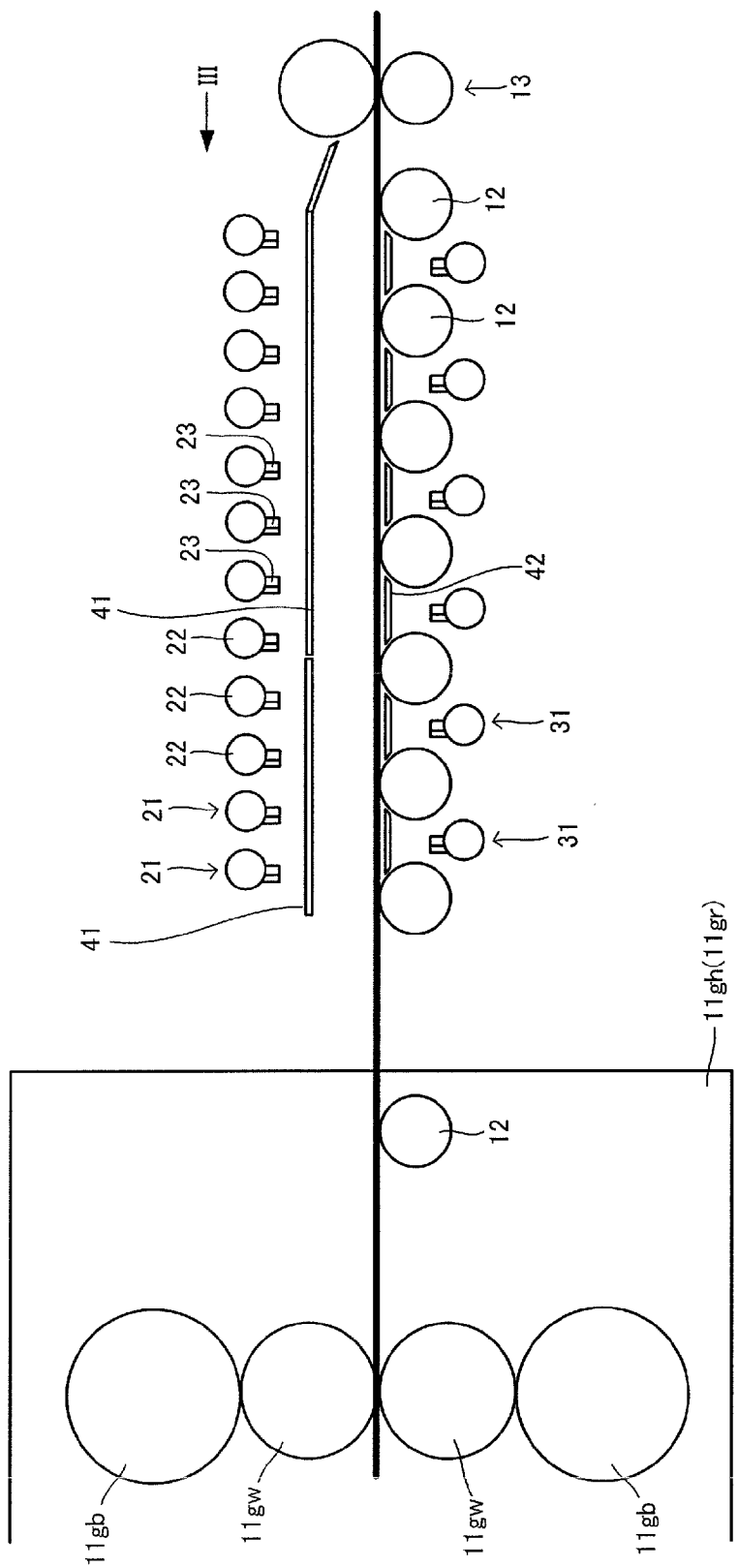
FIG. 2 is an enlarged view of a portion where a cooling apparatus 20 is provided in FIG. 1, to explain the structure of the cooling apparatus 20.
Figure 3:
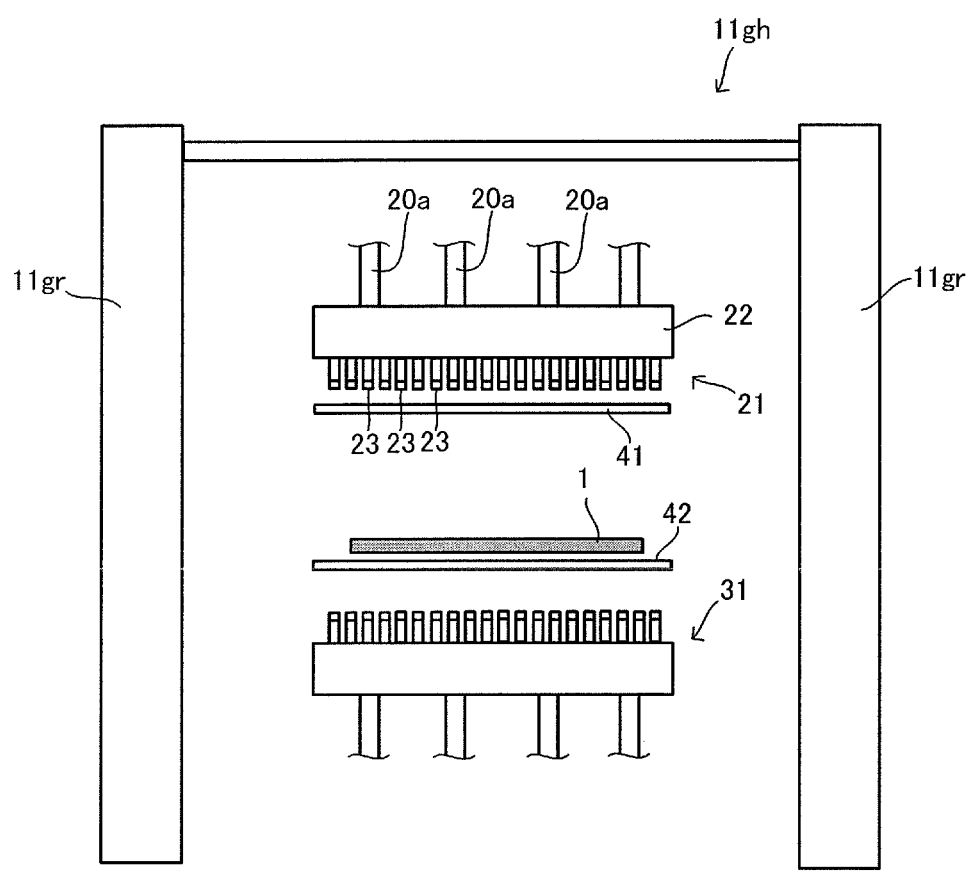
FIG. 3 is a schematic view of the manufacturing apparatus 10 seen from a direction shown by III in FIG. 2.

Hereinafter, the manufacturing apparatus 10 of a hot-rolled steel sheet (hereinafter may be simply referred to as "manufacturing apparatus 10") will be specifically described. FIG. 2 is an enlarged view of a portion where the cooling apparatus 20 is provided in FIG. 1, to explain the structure of the cooling apparatus 20. FIG. 3 is a schematic view of the manufacturing apparatus 10 seen from a direction shown by III in FIG. 2. Therefore, in FIG. 3, the vertical direction on the sheet of paper is the vertical direction of the manufacturing apparatus 10, the left and right direction on the sheet of paper is the sheet width direction, and the back-to-front direction on the sheet of paper is the sheet passing direction.

In the row 11 of hot finish rolling mills in this embodiment, seven stands 11a, ..., 11f, 11g are arranged in parallel along the sheet passing direction as can be seen from FIG. 1. Each stand 11a, ..., 11f, 11g is provided with a rolling mill, and its rolling conditions such as rolling reduction are set so that the steel sheet to be rolled can satisfy the conditions required of a steel sheet as a final product, such as thickness, mechanical property, and surface quality.

Rolling mills of the stands 11a, ..., 11f, 11g respectively have pairs of work rolls 11aw, 11aw, ..., 11fw, 11fw, 11gw, 11gw that actually pinch and reduce the steel sheet, and pairs of backup rolls 11ab, 11ab, ..., 11fb, 11fb, 11gb, 11gb arranged such that the outer peripheries thereof are respectively in contact with the outer peripheries of the work rolls. Also, the rotation axes of the work rolls and the backup rolls are arranged between erected portions of a housing 11ah, ..., 11fh, 11gh (see erected portions 11gr in FIG. 3 for the final stand 11g) erected facing to each other so as to include the work rolls and the backup rolls inside thereof. That is, the erected portions of the housing are, as can be seen from FIG. 3, erected in such a manner that the line of sheet passing (pass line) of the steel sheet 1 is interposed between the elected portions.

The transporting roll 12 forms a table of the steel sheet 1 and at the same time a roll which transports the steel sheet 1 in a sheet passing direction. Therefore, the transporting roll 12 is arranged in a plural manner along the sheet passing direction having a predetermined gap. The draining roll 13 is a roll for preventing the pressurized water sprayed from the cooling apparatus 20 from flowing out on the lower process side, by pinching the steel sheet 1 in rolling.

The cooling apparatus 20 is arranged between the row 11 of hot finish rolling mills and the draining roll 13, which cools the steel sheet after rolled. The cooling apparatus 20 is provided with a water supplying means 21 on an upper surface side thereof, a water supplying means 31 on a lower surface side, a guiding sheet 41 on the upper surface side, and a guiding sheet 42 on the lower surface side.

The water spraying means 21 on the upper surface side is arranged above the pass line and supplies the cooling water to the upper surface side of the steel sheet 1. The water spraying means 21 is provided with a header 22 and a nozzle 23.

The header 22 is, as can be seen from FIGS. 2 and 3, a pipe extending in the sheet width direction and arranged in parallel in a plural manner in the sheet passing direction. To the header 22, cooling water is supplied from a water-supply pipe 20a, and the cooling water is supplied to each nozzle 23 as is shown in FIG. 3.

Figure 4:
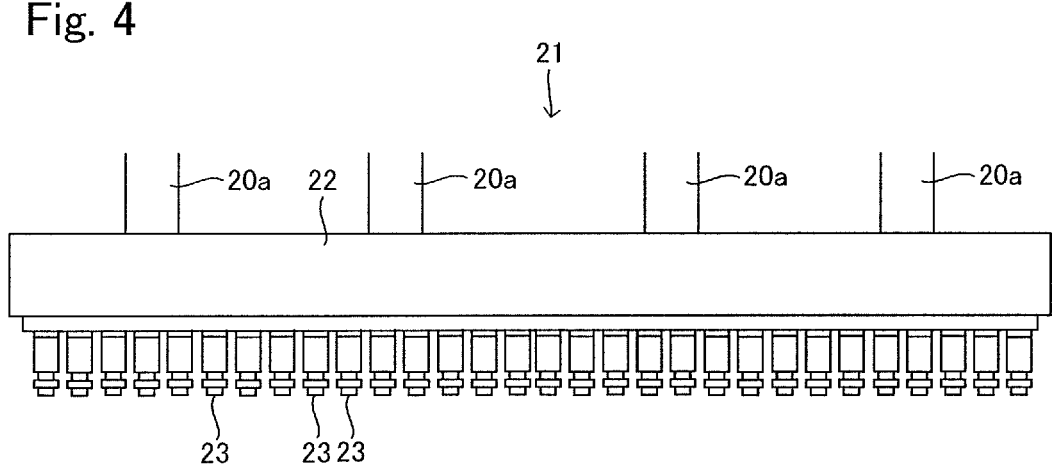
FIG. 4 is a view focusing on a part of a water supplying means 21 in FIG. 3.
Figure 5:
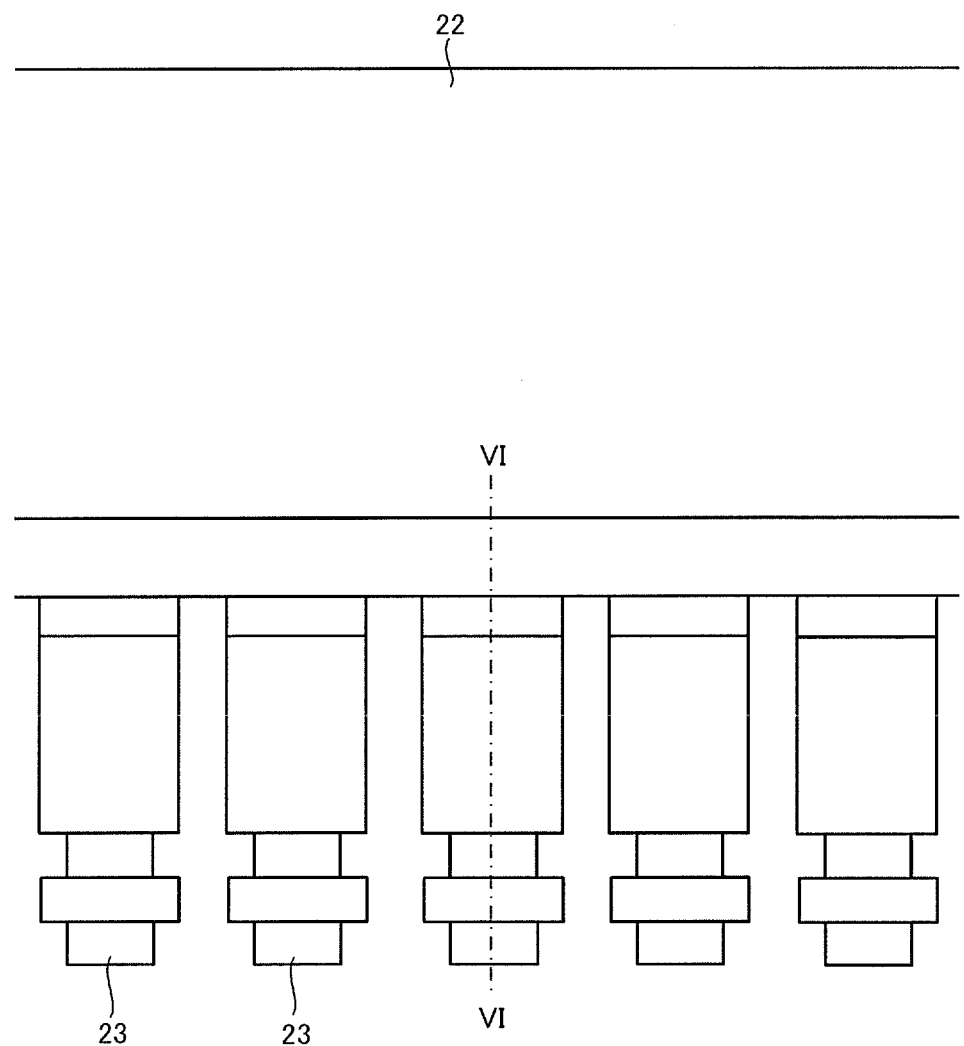
FIG. 5 is an enlarged view of a part of FIG. 4.
Figure 6:
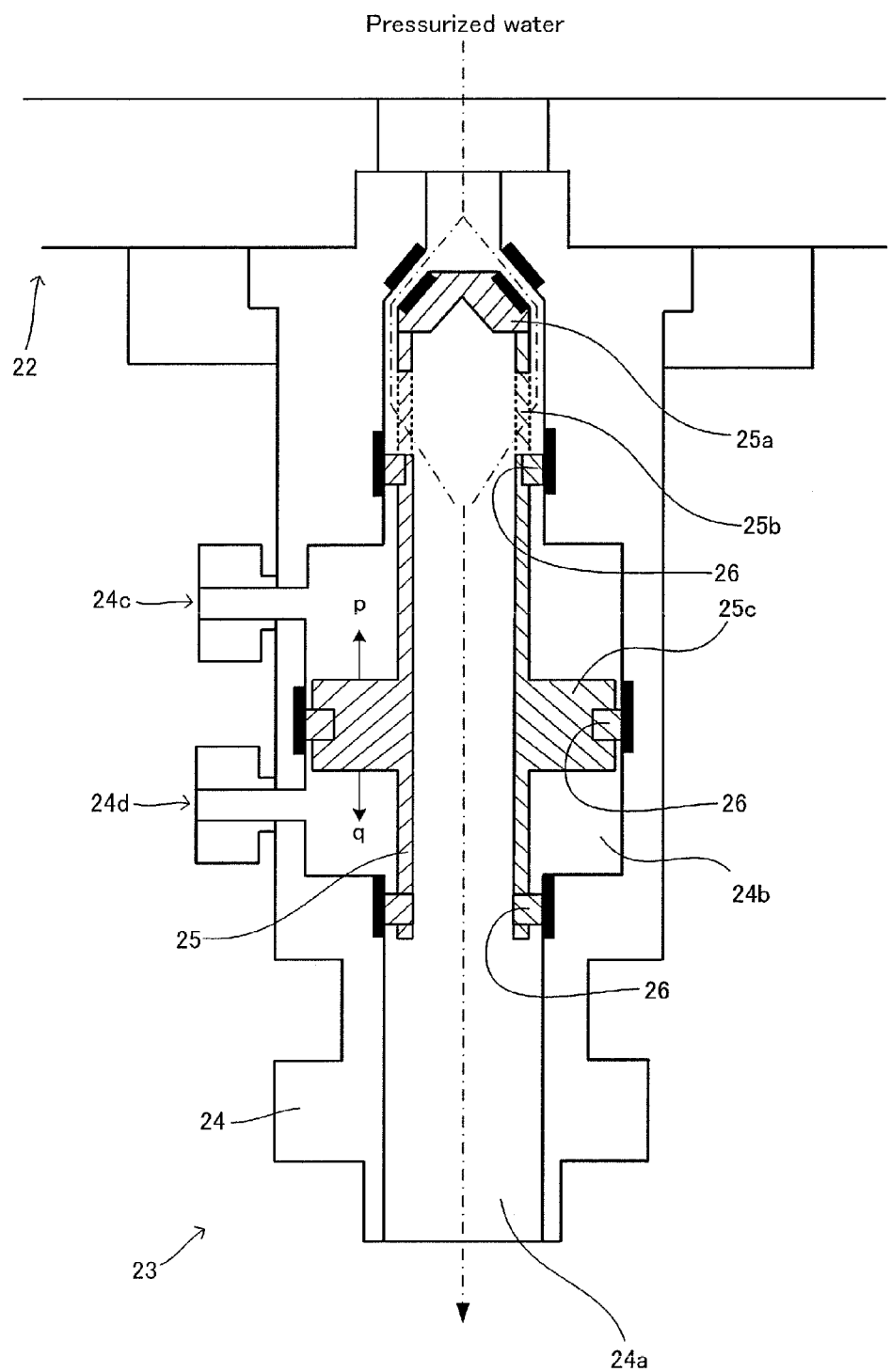
FIG. 6 is a cross-sectional view taken along a line shown by VI-VI in FIG. 5.

The nozzle 23 is branched off from the header 22 in a plural form, and its injection port faces the upper surface side of the steel sheet 1 (pass line). FIG. 4 is a view focusing on a part of the water supplying means 21 in FIG. 3. FIG. 5 is an enlarged view of a part in FIG. 4. Further, FIG. 6 shows a cross section taken along the line shown by VI-VI in FIG. 5. Therefore, FIG. 6 shows a cross section of the nozzle 23.

The nozzle 23 is, as can be seen from FIGS. 3 to 5, arranged in a corm-teeth manner and in a plural manner, along the pipe length direction of the header 22, that is, in the sheet width direction. The nozzle 23 of this embodiment is a flat type spray nozzle which can form a fan-shaped jet of cooling water (for example, having a thickness of around 5 mm to 30 mm). However, the nozzle 23 is not limited to this, and a thickening flat spray nozzle, a full-cone spray nozzle and the like can be used as the nozzle 23. According to these nozzles, temperature unevenness is difficult to occur in cooling.

Also, as can be seen from FIG. 6, the nozzle 23 has a nozzle body 24, and a passage 24a through which the pressurized water passes is formed inside the nozzle body 24. One end of the passage 24a leads into the header 22, and the other end is opened. A switching valve 25 is arranged inside the passage 24a. The switching valve 25 is configured to move inside the passage 24a, to thereby switch close and open of the passage. Specifically the switching valve 25 is configured as follows.

The switching valve 25 is a member formed in a bottomed cylindrical shape having a bottom 25a on one side. The other side is opened. The outer periphery of the switching valve 25 is formed so as to be slightly smaller than the inner periphery of the passage 24a. Also, an edge portion on an outer periphery side of the bottom 25a is obliquely cut out, formed in a manner to be along an inclined portion formed in accordance with tube expansion of an inner peripheral surface of the passage 24a. A hole 25b is provided for a part of a side wall of the switching valve 25, communicating inside and outside of the cylindrical shape. Further, a protrusion 25c is provided in a manner to project from an outer peripheral surface of the switching valve 25. Also a sealing material 26 is provided for different positions of the outer peripheral surface of the switching valve 25, which are portions having contact with the inner surface of the passage 24a. In this embodiment, the sealing material 26 is arranged on each of an edge portion on a downstream side of the hole 25b, an outer peripheral portion of the protrusion 25c, and an outer peripheral portion of an edge portion on a downstream side of the switching valve 25. In many cases, the sealing material 26 is normally configured by a rubber and the like, in order to increase a sealing property.

The switching valve 25 as described above is arranged inside the passage 24a of the nozzle body 24 as shown in FIG. 6. That is, the bottom 25a is arranged so as to be positioned on the upstream side of the passage 24a. Since the outer periphery of the switching valve 25 is formed smaller than the inner periphery of the passage 24a as described above, a gap is formed between the switching valve 25 and the inner surface of the passage 24a. The opening and closing of the nozzle 23 can be switched by switching contact and separation of the outer surface of the bottom 25a and the inner surface of the passage 24a.

Further, the protrusion 25c is arranged inside an expanded portion 24b in which an inner diameter provided to the passage 24a of the nozzle body 24 is expanded, and the protrusion portion 25c is positioned so as to partition the expanded portion 24b. A passage 24c is connected to one side of the partitioned portion and a passage 24d is connected to the other side of the partitioned portion. The working fluid flows in and out from the passage 24c and the passage 24d. When the switching valve 25 is pressurized by the working fluid from the passage 24c, it moves in a direction shown by the arrow q in FIG. 6, to thereby open the passage. On the other hand, when the switching valve 25 is pressurized by the working fluid from the passage 24d, it moves in a direction shown by the arrow p in FIG. 6, to thereby close the passage.

In this embodiment, the inner surface of the passage 24a and a portion of the bottom portion 25a of the switching valve 25 which is to have contact with the inner surface of the passage 24a are coated by diamond-like carbon (hereinafter may be referred to as "DLC"). This makes it possible to improve abrasion resistance property at the contact portion of the bottom portion 25a and the passage 24a. It becomes also possible to improve slidability at the contact portion of the sealing material 26 and the inner surface of the passage 24a. That is, by improving abrasion resistance property and slidability, it becomes possible to improve durability of the nozzle. Also, coating of DLC can be carried out at a low cost compared to the stellite build up. Therefore, as can be shown from the above explanation, considering that the manufacturing apparatus 10 requires a large amount of nozzles, a great advantage regarding cost can be attained as well.

Further, the inventors have found out, as a result of the following study, that the stellite build up can be replaced by the coating by DLC. That is, generally, when the valve of the high-pressure pipe is closed, water moves inertially at a downstream side of the valve; and at the vicinity of the downstream side of the valve, a vacuum portion is created whereby a phenomenon called cavitation occurs, in which surrounding water is depressurized and air bubble is created in the water. After that, the air babble disappears when the pressure of the water returns to normal. However, a shock wave is created when the air babble disappears. If the air babble attached to the inside of the pipe disappears, an erosion occurs, which damages the pipe. Also, even if the valve is opened, water pressure becomes high at a narrow point in the passage where the valve is arranged, and there is a possibility that the cavitation occurs when the water pressure decreases. Therefore, it is most appropriate to apply a strong stellite build up to the point where water tightness is required, such as the valve in the high-pressure pipe.

On the other hand, the inventors had a presumption as follows. In a case where the valve is installed to the nozzle, since there is a short distance from the valve to the outside of the nozzle even if the valve is closed, air enters inside the nozzle from outside. Therefore, the periphery of the valve does not have a state of vacuum, whereby the cavitation does not occur. In a case where the opening degree of the valve is shortened, the cavitation possibly occurs. However water is discharged outside the nozzle before having a high pressure to eliminate the air babble. Therefore, not only the stellite build up having an erosion resistance property, but also a means which does not have an erosion resistance property can be applied to the nozzle having a valve. Based on this presumption, the inventors thought that it is possible to extend the lifetime of the nozzle having a valve, by applying a coating which improves abrasion resistance property to the opening/closing portion and the slide portion of the valve, not a building up having a certain degree of thickness. From this viewpoint, as the kind of the coating, TiCN, TiN, TiAlN, CrN and the like were thought. However, since the nozzle to spray water is not required to have a heat-resistant property, the inventors have reached a conclusion that DLC coating is appropriate, which has a low friction coefficient, a high hardness, and a low friction, and which can be carried out at a relatively low temperature (200° C.) whereby the nozzle and the valve are not damaged in coating. Then, the inventors prepared a prototype wherein DLC coating is applied, and carried out a confirmation test to confirm its function did not have any problem. The result was not inferior to a prototype in which the stellite build up was applied.

In this embodiment, as the portions colored in black in FIG. 6, DLC coating was applied to the portion of the inner surface of the passage 24a where is in contact with the bottom portion 25a of the switching valve 25, and an area having contact (sliding) with the sealing material 26, which especially require abrasion resistance property and sliding property as described above. However, the DLC coating is not limited to be regional, and can be carried out to the entirety of the inner surface of the passage 24a, or an area wider than the above described required portion and area.

As described above, since the opening and closing of the nozzle 23 is carried out by repeating the contacting and separating of the contact portion of the bottom portion 25a of the switching valve 25 and the inner surface of the passage 24a of the nozzle body 24, the contact portion preferably has a high abrasion resistance property. On the other hand, it is preferable that a good sliding property (having a small friction coefficient) is attained between the sealing material 26 and the inner surface of the passage 24a. According to DLC, both properties can be improved compared to the conventional method, whereby it is possible to improve the both properties. However, in view of a further improvement in property, a DLC having an improved abrasion resistance property can be applied to the contact portion of the bottom portion 25a of the switching valve 25 and the inner surface 24a of the nozzle body 24. To achieve this, for example a method of reducing the ratio of hydrogen contained in DLC can be given.

A known method can be used for the coating of DLC described above.

Going back to FIGS. 2 and 3, the water supplying means 31 on a lower surface side will be described. As can be seen from FIGS. 2 and 3, the water supplying means 31 on the lower surface side is arranged below the pass line and which supplies pressurized water to the lower surface side of the steel sheet 1. The water supplying means 31 on the lower surface side is arranged facing the above described water supplying means 21 on an upper surface side. The spraying direction of the pressurized water of the water supplying means 31 is different from that of the water supplying means 21. However, each structure of the water supplying means 31 is same as that of the water supplying means 21 on the upper surface side described above. It should be noted that, since the transporting roll 12 is arranged under the steel sheet 1, the water supplying means 31 has a configuration of spraying pressurized water over the lower surface side of the steel sheet 1 from between the transporting roll 12.

The guiding sheet 41 on the upper surface side is a sheet-like member arranged between the pass line where the steel sheet 1 is to be transported and the water supplying means 21 on the upper surface side. The guiding sheet 41 on the upper surface side prevents a tip or other portions of the steel sheet 1 from having contact with or being caught by the water supplying means 21 on the upper surface side. The guiding sheet 41 on the upper surface side is provided with a hole for the pressurized water sprayed from the nozzle 23 to pass through, and the pressurized water sprayed from the nozzle 23 reaches the steel sheet 1 via the hole. Also a discharging hole can be provided for the guiding sheet 41 on the upper surface side which lets discharging water pass through.

The guiding sheet 42 on the lower surface side is a sheet-like member arranged between the water supplying means 31 on the lower surface side and the pass line where the steel sheet 1 is to be transported. The guiding sheet 42 makes it possible to prevent the tip most of the steel sheet 1 from being caught by the water supplying means 31 and the transporting roll 12, especially when the steel sheet 1 is transported to the manufacturing apparatus 10. Also, the guiding sheet 42 on the lower surface side is provided with an inflow hole which lets the jet of pressurized water from the water supplying means 31 on the lower surface side pass through. This enables the jet of pressurized water from the water supplying means 31 on the lower surface side to pass through the guiding sheet 42 on the lower surface side to reach the lower surface of the steel sheet 1, whereby it is possible to efficiently cool the steel sheet 1. Also, a discharging hole can be provided for the guiding sheet 42 on the lower surface side which lets discharging water pass through. Here, the guiding sheet 42 is arranged between the work rolls 11gw and the transporting roll 12, between two of the transporting rolls 12, and between the transporting roll 12 and the draining roll 13.

According to the structure of the manufacturing apparatus 10, especially the structure of the nozzle 23 of the cooling apparatus 20, it is possible to improve durability of the contact portion made in accordance with the movement of the switching valve 25 in the nozzle 23, the movement for spraying and stopping spraying of water. Further, the improvement of the durability can be carried out easier and inexpensively than before with the structure. As described above, since a large number of nozzles are used in one manufacturing apparatus and cooling apparatus, a great effect can be attained.

Next, an example of a manufacturing method of a hot-rolled steel sheet in which the water supplying means 21 and 31 are used will be described. As a whole, for example a steel sheet is manufactured as follows by means of the manufacturing apparatus 10 described above. That is, a preceding steel sheet 1 is coiled by the coiler, thereafter the rolling of a following steel sheet 1 starts. The tip of the following steel sheet 1 passes through the row 11 of hot finish rolling mills, and immediately after the tip of the steel sheet 1 passes the pinch roll which is not shown but arranged on the lower process side, pinching of the steel sheet 1 starts. This realizes an establishment of a predetermined tension to the steel sheet 1, thereafter the rolling at a constant region starts. The steel sheet 1 successively passes the row 11 of hot finish rolling mills, to obtain a desirable shape and surface property. The rolled steel sheet 1 is finally coiled by a coiler.

In this sequence of hot rolling, the cooling apparatus 20 is arranged on the lower process side of the row 11 of hot finish rolling mills, and sprays the pressurized water from the water supplying means 21 and 31 over the steel sheet 1, to control the temperature of the steel sheet 1 to be a desirable temperature. A basic operation of the water supplying means 21 and 31 is as follows. Here, the explanation is carried out taking the water supplying means 21 as an example.

The nozzle 23 sprays the pressurized water as follows. That is, as shown by a dashed line in FIG. 6, with the opening position of the switching valve 25, the pressurized water flows from inside the pipe of the header 22 to inside the passage 24a of the nozzle 23. The pressurized water is then sprayed from the opening end of the nozzle body 24 toward the steel sheet 1. That is, the pressurized water collides against the bottom portion 25a of the switching valve 25, and flows between the inner surface of the passage 24a and the switching valve 25, then flows from the hole 25b into the switching valve 25. Thereafter the pressurized water reaches the opening end which is the other end of the switching valve 25, then is sprayed from the opening end of the nozzle body 24.

Figure 7:
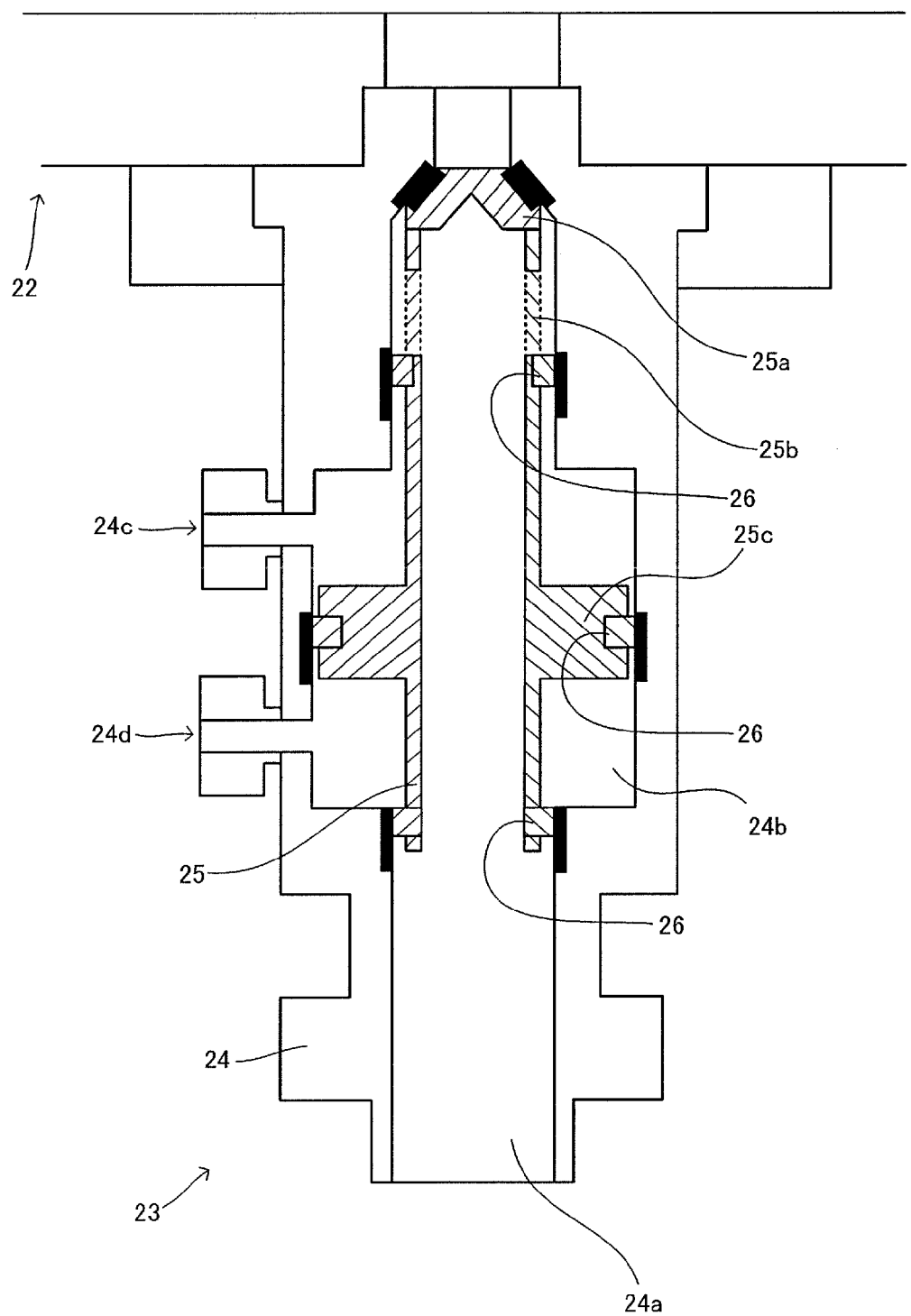
FIG. 7 is a view to explain a closing position of a nozzle 23.

On the other hand, with the closing position of the switching valve 25, the switching valve 25 moves upward as the position from FIG. 6 to FIG. 7, and the inner surface of the passage 24a and the bottom portion 25a are in contact with each other. This closes the passage of the pressurized water, and spraying of the pressurized water from the nozzle 23 is inhibited.

Figure 8:
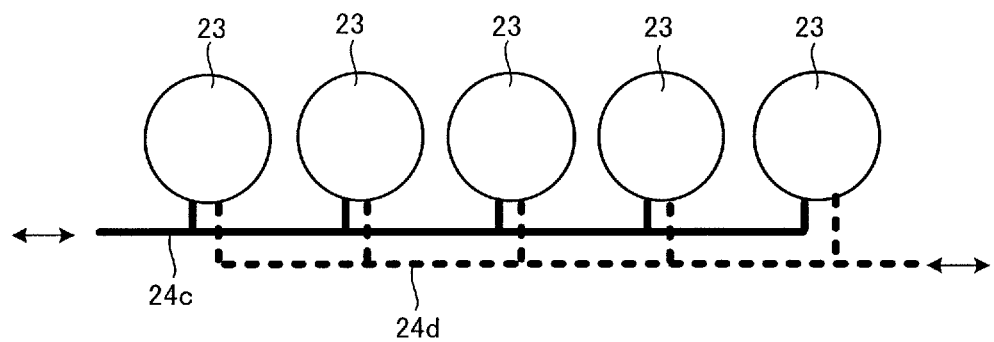
FIG. 8 is a view to explain a flow of a working fluid.

Opening and closing of the switching valve 25 is carried out by the working fluid flowing in the passages 24c and 24d. FIG. 8 is a view for explanation. FIG. 8 is a conceptual view wherein FIG. 6 is seen from below. As can be seen from FIGS. 6 to 8, regarding the working fluid of the switching valve 25, the passage 24c for opening the valve and the passage 24d for closing the valve are separated. Therefore, when the inside of the passage 24c for opening the valve is pressurized to push the working fluid, the switching valve 25 moves in the direction of the arrow q to have the opening position, as can be seen from FIG. 6. In this regard, the working fluid in the passage 24d for closing the valve moves in a manner to be pushed out. To close the switching valve 25, it is only necessary to pressurize the inside of the passage 24d for closing the valve, whereby the switching valve 25 has the position shown in FIG. 7.

Figure 9:
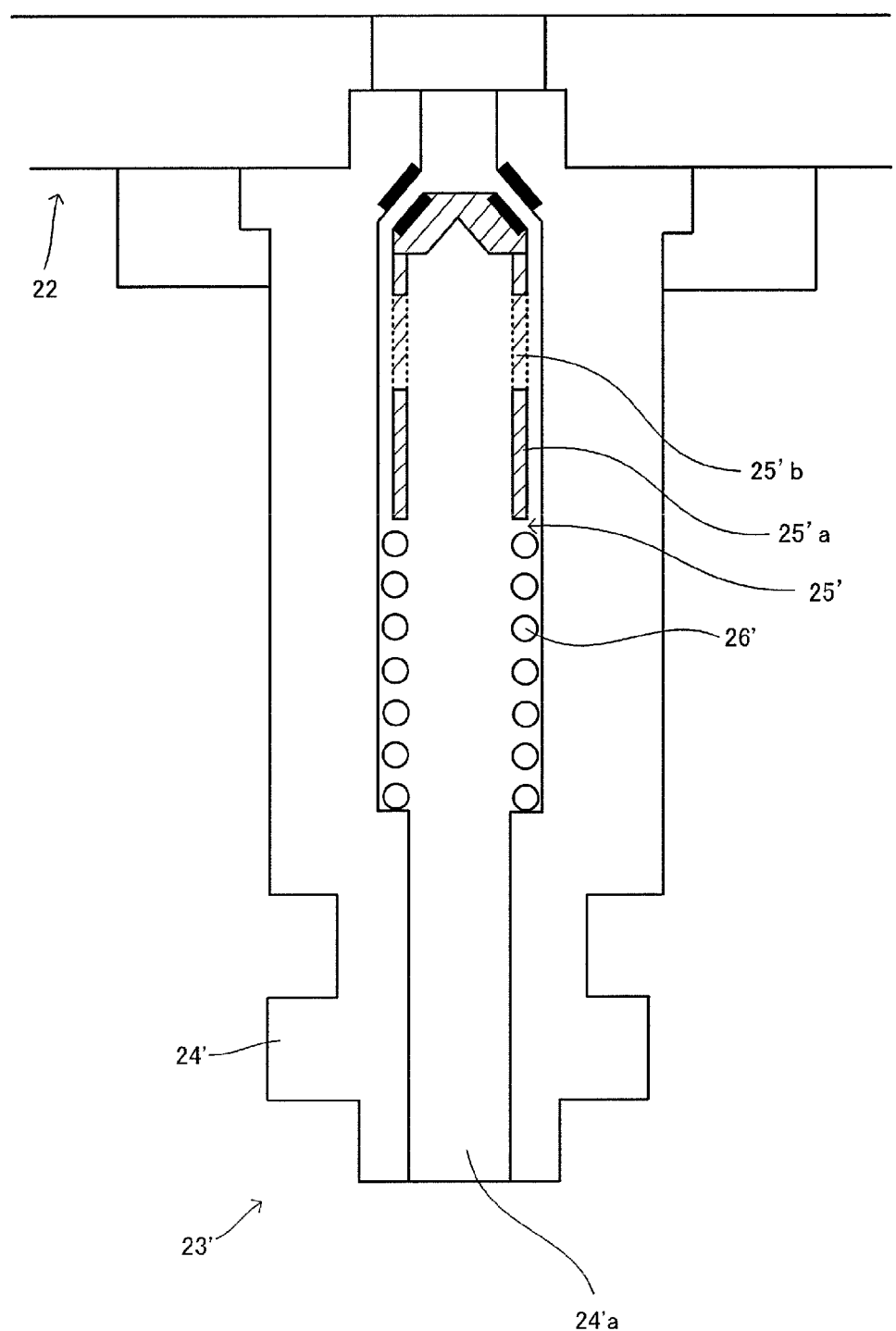
FIG. 9 is a cross-sectional view to explain a nozzle of another example.

FIG. 9 is a view showing another example of the water supplying means. FIG. 9 is seen from the same point of sight as that of FIG. 6.

In this example, the water supplying means differs in that a nozzle 23' is provided instead of the nozzle 23. The nozzle 23' is an example in which a switching valve 25' being a so-called check valve is provided. The switching valve 25' has contact with an inner surface of the passage 24'a of a nozzle body 24' at a valve body 25'a which is biased by a spring 26', to thereby close the passage 24'a. On the other hand, pressurized water to be sprayed presses the valve body 25'a and moves the valve body 25'*a* against a biasing force of the spring 26', to separate the valve body 25'*a* from the inner surface of the passage 24'*a*, then open the passage 24'*a*. Whereby, the pressurized water is sprayed. The valve body 25'*a* is provided with a hole 25'*b* which is similar to the hole 25*b* described above, and the flow of the pressurized water is same as in the nozzle 23.

Therefore, in this configuration as well, an abrasion resistance property is required of the contact portion of the valve body 25'*a* and the passage 24'*a*, and the above-mentioned DLC can be applied to the contact portion, as the portions shown in black in FIG. 9.

The nozzle and the cooling apparatus described above are useful for a cooling apparatus for a hot-rolled steel sheet in a manufacturing line of hot-rolled steel sheet. Other than this, for example an application for a descaling apparatus of a hot-rolled steel sheet can also be considered.

DESCRIPTION OF REFERENCE NUMERALS

1 steel sheet
10 manufacturing apparatus
11 row of hot finish rolling mills
12 transporting roll
13 draining roll
20 cooling apparatus
21 water supplying means on upper surface side
22 header
23 nozzle
24 nozzle body
25 switching valve
31 water supplying means on lower surface side

The invention claimed is:

1. A nozzle for spraying water over a targeted object, comprising:
   a nozzle body provided with a passage of the water; and
   a valve arranged inside the passage of the nozzle body; and
   a sealing material that is provided for at least part of an outer peripheral surface of the valve, wherein
   at least a part of an inner surface of the passage, the part of an inner surface including a portion to have contact with the valve, is coated by diamond-like carbon,
   at least another part of an inner surface of the passage, said another part of an inner surface including a portion to have contact with the sealing material, is coated by diamond-like carbon, and
   the portion to have contact with the sealing material is a portion where the sealing material is always in contact with the inner surface of the passage and the portion to have contact with the sealing material on the inner surface of the passage slides with the valve in accordance with opening and closing of the valve.

2. The nozzle according to claim 1, wherein the valve is a switching valve.

3. The nozzle according to claim 1, wherein the portion to have contact with the valve is a portion where spraying of the water is inhibited by the valve having contact with the inner surface of the passage and the spraying of the water is allowed by the valve moving from a position of contacting to a position of separating.

4. The nozzle according to claim 1, wherein
   the passage has an expanded portion in which an inner diameter of the passage is expanded,
   a protrusion is provided for the valve in a manner to project from the outer peripheral surface of the valve, the protrusion being positioned so as to partition the expanded portion,
   the sealing material is provided for each of upstream and downstream sides across the expanded portion on the outer peripheral surface of the valve, and
   the sealing material is provided for at least part of a portion of the protrusion to have contact with the expanded portion.

* * * * *